US011537832B2

(12) United States Patent
Nayak et al.

(10) Patent No.: US 11,537,832 B2
(45) Date of Patent: Dec. 27, 2022

(54) MULTIPLE-PATTERN FIDUCIAL FOR HETEROGENEOUS IMAGING SENSOR SYSTEMS

(71) Applicant: Hewlett-Packard Development Company, L.P., Spring, TX (US)

(72) Inventors: Vijaykumar Nayak, San Diego, CA (US); Yun David Tang, Spring, TX (US); Roya Susan Akhavain, San Diego, CA (US); Hao Meng, San Deigo, CA (US); Brian R. Jung, San Diego, CA (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 17/058,347

(22) PCT Filed: Nov. 12, 2018

(86) PCT No.: PCT/US2018/060270
§ 371 (c)(1),
(2) Date: Nov. 24, 2020

(87) PCT Pub. No.: WO2020/101635
PCT Pub. Date: May 22, 2020

(65) Prior Publication Data
US 2021/0365755 A1 Nov. 25, 2021

(51) Int. Cl.
*G06K 19/06* (2006.01)
*G06V 10/10* (2022.01)

(52) U.S. Cl.
CPC . *G06K 19/06037* (2013.01); *G06K 19/06131* (2013.01); *G06V 10/10* (2022.01)

(58) Field of Classification Search
CPC ....... G06K 19/06037; G06K 19/06131; G06K 19/06; G06V 10/10; G06V 10/20
See application file for complete search history.

(56) References Cited

U.S. PATENT DOCUMENTS

| 6,640,130 | B1 | 10/2003 | Freeman et al. |
| 8,224,024 | B2 | 7/2012 | Foxlin et al. |
| 9,756,324 | B1 | 9/2017 | Flanagan et al. |
| 2002/0186884 | A1 | 12/2002 | Shaked et al. |
| 2004/0028258 | A1 | 2/2004 | Naimark et al. |
| 2007/0273795 | A1 | 11/2007 | Jaynes et al. |
| 2010/0214344 | A1 | 8/2010 | Sjolander et al. |

(Continued)

FOREIGN PATENT DOCUMENTS

| WO | 2001/024106 A1 | 4/2001 |
| WO | WO-2010140983 A1 | 12/2010 |
| WO | WO-2018144531 A1 | 8/2018 |

OTHER PUBLICATIONS

BC. Jan Smisek, 3D Camera Calibration, Research Reports of CMP, Czech Technical University in Prague, No. 6, Jun. 2, 2011, 94 pgs.

*Primary Examiner* — Matthew Mikels
(74) *Attorney, Agent, or Firm* — Quarles & Brady LLP

(57) ABSTRACT

A multiple-pattern fiducial for a heterogeneous imaging sensor system. The multiple-pattern fiducial includes a first pattern detectable by a first wavelength of electromagnetic energy, and a second pattern detectable by a second wavelength of electromagnetic energy.

20 Claims, 8 Drawing Sheets

(56) References Cited

U.S. PATENT DOCUMENTS

| | | | |
|---|---|---|---|
| 2011/0084130 A1* | 4/2011 | Lapstun | G06K 19/04 235/375 |
| 2012/0000983 A1 | 1/2012 | Bhagwan et al. | |
| 2012/0050758 A1 | 3/2012 | Jodra et al. | |
| 2012/0113276 A1 | 5/2012 | Van Arendonk et al. | |
| 2012/0200734 A1 | 8/2012 | Tang | |
| 2015/0125053 A1 | 5/2015 | Vieceli et al. | |
| 2016/0321530 A1* | 11/2016 | Troy | G06T 19/006 |
| 2017/0323129 A1 | 11/2017 | Davidson et al. | |

* cited by examiner

MULTIPLE-PATTERN FIDUCIAL FOR HETEROGENEOUS IMAGING SENSOR SYSTEMS

BACKGROUND

Three-dimensional (3D) imaging allows for the scanning of objects to obtain a graphical representation of the object that is displayable via a computing device and a display device coupled to the computing device. The graphical representation may be a 3D model of the object that may be manipulated using a 3D drawing program or a computer-aided design and drafting program. Further, infrared-based detection processes may be used to detect and track objects in space for applications in surveillance, security, and other applications.

BRIEF DESCRIPTION OF THE DRAWINGS

The accompanying drawings illustrate various examples of the principles described herein and are part of the specification. The illustrated examples are given merely for illustration, and do not limit the scope of the claims.

Figure 1:
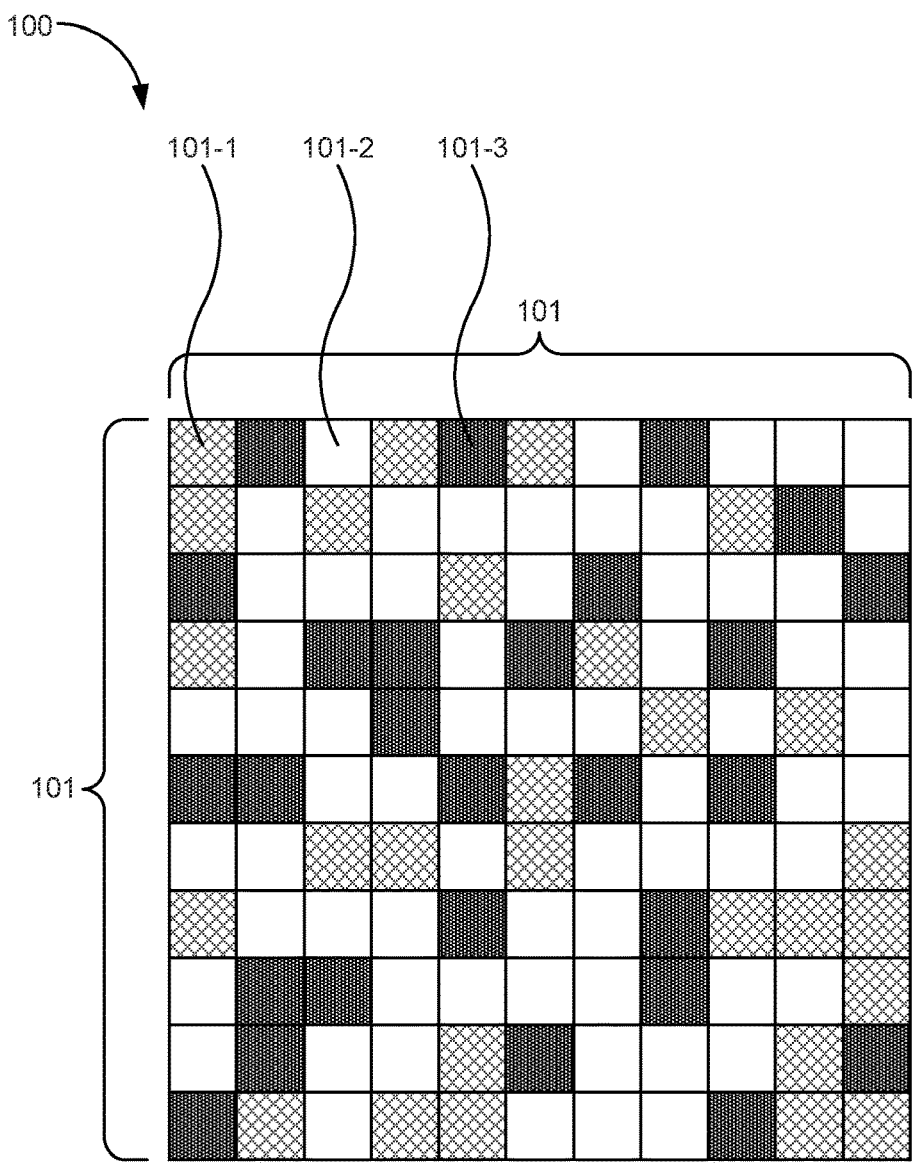
FIG. 1 is a block diagram of a multiple-pattern fiducial for a heterogeneous imaging sensor system, according to an example of the principles described herein.

Throughout the drawings, identical reference numbers designate similar, but not necessarily identical, elements. The figures are not necessarily to scale, and the size of some parts may be exaggerated to more clearly illustrate the example shown. Moreover, the drawings provide examples and/or implementations consistent with the description; however, the description is not limited to the examples and/or implementations provided in the drawings.

DETAILED DESCRIPTION 3D imaging systems may be used to capture 3D images of objects to create a digital 3D model of the object for display and/or manipulation. The 3D model may include hyper-realistic texture that maintains separate diffuse color, displacement, and normal maps that are ready for rendering and for use in, for example, enhanced reality or virtual reality applications. Within the 3D imaging systems, infrared (IR) imaging devices or sensors may be used to capture the 3D images of objects.

As mentioned above IR-based detection and tracking may be used for surveillance, security and other applications. Some computer vision processes may be used to identify and track fiducials using materials reflecting a single, specific spectrum of electromagnetic energy such as the IR wavelengths, when illuminated with an IR electromagnetic energy emission device. The identification and tracking of fiducials may be used for locating and segmenting foreground objects. However, detection and tracking with an IR imaging device alone may not generate consistent results where information of other spectrums including visible light may be able to assist in these applications.

Examples described herein provide a multiple-pattern fiducial for a heterogeneous imaging sensor system. The multiple-pattern fiducial includes a first pattern detectable by a first wavelength of electromagnetic energy, and a second pattern detectable by a second wavelength of electromagnetic energy. The first and at least second pattern may convey different information. The multiple-pattern fiducial may be a two-dimensional (2D) based fiducial. The multiple-pattern fiducial may be a three-dimensional (3D) based fiducial.

Examples described herein also provide a heterogeneous imaging sensor system. The heterogeneous imaging sensor system includes a multiple-pattern fiducial including a plurality of patterns detectable by a corresponding number of wavelengths of electromagnetic energy, a first imaging device to sense a first of the plurality of patterns, the first imaging device detecting a first of the number of wavelengths of electromagnetic energy, and a second imaging device to sense a second of the plurality of patterns, the second imaging device detecting a second of the number of wavelengths of electromagnetic energy.

The heterogeneous imaging sensor system may include a weighting module executable by a processing device of the heterogeneous imaging sensor system to weight the influence of the first imaging device and the influence of the second imaging device in detecting the multiple-pattern fiducial. The weighting may be based on signal strength, positions of the first and second imaging devices, the angles of the first and second imaging devices, a size of detected features, a quantity of detected features, or combinations thereof. The weighting module may use statistical signal analysis, probability-based prediction for multi-mode tracking, sensor fusion, or combinations thereof.

The heterogeneous imaging sensor system may also include a calibration module executable by a processing device of the heterogeneous imaging sensor system to perform geometry-based calibration for imaging device-to-imaging device three-dimensional (3D) mapping. The calibration module may also perform visible wavelength signal calibration, infrared wavelength signal calibration, ultraviolet (UV) signal calibration, or combinations thereof.

The multiple-pattern fiducial may include a plurality of multiple-pattern fiducial imageable by the first and second imaging devices. The plurality of multiple-pattern fiducials may be located at different locations within a field of view of the first and second imaging devices. Further, each of the plurality of multiple-pattern fiducials may include different patterns, reflect different wavelengths of electromagnetic radiation, or combinations thereof.

Examples described herein also provide a method of detecting objects. The method may include placing a multiple-pattern fiducial on an object, with a first imaging device, sensing a first pattern of the multiple-pattern fiducial detectable by a first wavelength of electromagnetic energy, and with a second imaging device, sensing a second pattern of the multiple-pattern fiducial detectable by a second wavelength of electromagnetic energy. The method may also include, with a weighting module executable by a processing device, weighting the influence of the first imaging device and the influence of the second imaging device in detecting the multiple-pattern fiducial based on signal strength, positions of the first and second imaging devices, the angles of the first and second imaging devices, a size of detected features, a quantity of detected features, statistical signal analysis, probability-based prediction for multi-mode tracking, sensor fusion, or combinations thereof.

The method may also include, with a calibration module executable by a processing device, performing geometry-based calibration for imaging device-to-imaging device three-dimensional (3D) mapping, and calibrating each of the first imaging device's and the second imaging device's settings at an optimal signal response. The method may also include performing visible wavelength signal calibration, infrared wavelength signal calibration, ultraviolet (UV) signal calibration, or combinations thereof.

Throughout the description, imaging devices may be described as being able to detect wavelengths of electromagnetic radiation. The detection of wavelengths of electromagnetic radiation may include the detection of a single wavelength of electromagnetic radiation, a group of wavelengths of electromagnetic radiation (i.e., ultraviolet wavelengths, visible wavelengths, infrared wavelengths, etc.), ranges of wavelengths of electromagnetic radiation, or combinations thereof. In one example, imaging devices that detect similar or the same wavelengths may be grouped together.

Turning now to the figures, FIG. 1 is a block diagram of a multiple-pattern fiducial (100) for a heterogeneous imaging sensor system, according to an example of the principles described herein. The multiple-pattern fiducial (100) includes any number of patterns detectable by a plurality of different sensors. The multiple-pattern fiducial (100) may be presented in any form including in the form of targets, random shapes, barcodes, quick-response (QR) codes, other fiducial marks, or combinations thereof. In the example of FIG. 1, the fiducial is presented in the form of a checkerboard fiducial where a number of boxes (101) are positioned adjacent one another.

Each box (101) within the fiducial (100) may include some form of applied feature such as a paint, a printing fluid, or a material that creates a pattern within the fiducial (100) under different wavelengths of electromagnetic radiation. In the example of FIG. 1, three different features (101-1, 101-2, 101-3) may form three different patterns in the fiducial (100). The features (101-1, 101-2, 101-3) may each be imageable when exposed to different wavelengths of electromagnetic energy and/or when imaged by different image capture devices that capture images in different wavelengths of light. For example, the pattern of features (101-1) may be detectable when exposed to infrared (IR) wavelengths of electromagnetic radiation or when an IR imaging device captures electromagnetic waves reflected off of the features (101-1). Similarly, the pattern of features (101-2) may be detectable when exposed to visible wavelengths of electromagnetic radiation or when a visible wavelength imaging device captures electromagnetic waves reflected off of the features (101-2). Further, the pattern of features (101-3) may be detectable when exposed to ultraviolet (UV) wavelengths of electromagnetic radiation or when a UV wavelength imaging device captures electromagnetic waves reflected off of the features (101-3). Even though the three types of features (101-1, 101-2, 101-3) are depicted as each being bounded by the boxes (101), each of the patterns may take separate and different shapes or forms, and, in one example, the separate and different shapes or forms may be overlaid on one another. In one example, each of the different features (101-1, 101-2, 101-3) may be imageable when exposed to a plurality of wavelengths of electromagnetic energy and/or when imaged by different image capture devices that capture images in different or the same wavelengths of electromagnetic energy.

The patterns of features (101-1, 101-2, 101-3) each include predetermined or predefined patterns that may be stored in memory. Thus, the pattern formed by each individual feature (101-1, 101-2, 101-3) with their respective wavelengths of reflected electromagnetic radiation are known and detectable. The patterns of features (101-1, 101-2, 101-3) may convey to an imaging device and any computing device communicatively coupled thereto information about the location of the fiducial, and, in turn, the angles and distances of the imaging devices from the fiducial (100). Each of the patterns formed by the features (101-1, 101-2, 101-3) may convey the same information, or may covey different information. Further, the different patterns formed by the features (101-1, 101-2, 101-3) assist a heterogeneous imaging sensor system in increasing the signal-to-noise ratio (SNR) between the level of any detected signals from the fiducial (100) by the imaging devices to the level of background noise.

In the examples described herein, the fiducial (100) may include patterns that convey different information for different ranges of electromagnetic radiation within the electromagnetic spectrum, the fiducial (100) may include different sensitivities to different spectral ranges, the fiducial (100) may provide the same information but in different spectral ranges, or the fiducial (100) may provide combinations thereof. These examples provide a higher signal-to-noise ratio (SNR). SNR is a measure that compares the level of a desired signal to the level of background noise. SNR is defined as the ratio of signal power to the noise power, often expressed in decibels. A SNR higher than 1:1 indicates more signal than noise. At a first wavelength within the electromagnetic spectrum the signal may be weak with a relatively lower SNR. However, at a second wavelength within the electromagnetic spectrum the signal may be strong, and the strength of the second wavelength may assist in strengthening the SNR. In this manner, a heterogeneous imaging sensor system that uses the multiple-pattern fiducial (100) may strengthen the SNR and, in turn, the ability to calibrate its imaging devices and provide more precise and accurate image processing such as 3D imaging, object detection, object tracking, foreground detection and segmentation for object tracking, and other imaging processes in which an object may be imaged in 3D space.

For example, some optical-based detection and tracking systems may utilize a depth imaging device that generates depth in the images using IR wavelengths of light. This type of tracking using the reflective pattern which is effective for a specific imaging device that detects electromagnetic radiation in a specific portion of the electromagnetic spectrum (i.e., infrared) may not be robust under certain pose and/or angle conditions when the SNR may drop significantly. That same phenomenon may occur in body-part tracking implementations where a user's body is tracked as it moves through space using an IR sensor and IR-reflective patterns. However, if a plurality of imaging devices that are able to sense different wavelengths within the electromagnetic spectrum were to be employed in concert with the IR sensor, these plurality of imaging devices may complement one another in a heterogeneous manner to increase the SNR. Thus, the fiducial (100) depicted in FIG. 1 provides for several different wavelengths of electromagnetic radiation to be employed in calibration and imaging processes.

In one example, the different patterns formed by the features (101-1, 101-2, 101-3) may convey different information in two or more separate spectrums of electromagnetic radiation so that in the same spatial encoding of the signals, twice as much information may be conveyed. Being able to convey more information in this manner provides for a denser transfer of data within a heterogeneous imaging sensor system.

Figure 2:
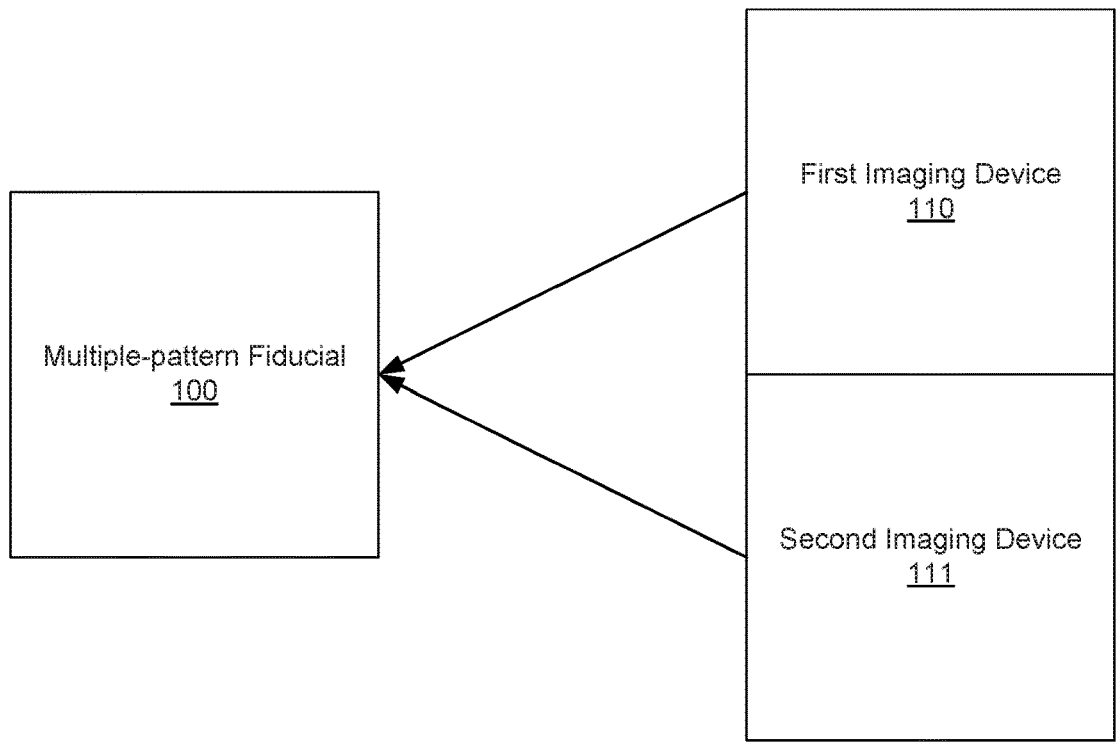
FIG. 2 is a block diagram of a heterogeneous imaging sensor system, according to an example of the principles described herein.

FIG. 2 is a block diagram of a heterogeneous imaging sensor system (200), according to an example of the principles described herein. In FIG. 2, a first imaging device (110) and a second imaging device (111) may be included in the heterogeneous imaging sensor system (200). Although two imaging devices (110, 111) are depicted in FIG. 2, any plurality of imaging devices may be included such that the heterogeneous imaging sensor system (200) may include from 2 to N number of imaging devices. The two imaging devices (110, 111) may be separate or integrated. In one example, each imaging device (110, 111) detects different wavelengths of electromagnetic radiation. In another example, a plurality of imaging devices (110, 111) with in the heterogeneous imaging sensor system (200) may detect the same or similar wavelengths of electromagnetic radiation, and at least one other imaging device (110, 111) may detected different wavelengths of electromagnetic radiation.

By way of detectable wavelengths of electromagnetic radiation, the imaging devices (110, 111) may detect gamma rays, ultraviolet (UV) wavelengths, visible wavelengths, infrared (IR) wavelengths, microwaves, and radio waves. More specifically, the imaging devices (110, 111) may detect gamma rays (wavelengths ($\lambda$) of approximately 1 picometer (pm)), hard x-rays ($\lambda$ of approximately 10's of pm to 100's of pm), soft x-rays ($\lambda$ of approximately 100's of pm to 10's of nanometers (nm)), extreme ultraviolet wavelengths ($\lambda$ of approximately 10's of nm to 100's of nm), near ultraviolet wavelengths ($\lambda$ of approximately 100's of nm to 1 of micrometer ($\mu$m)), visible spectrum wavelengths ($\lambda$ of approximately 400 nm to 700 nm), near infrared ($\lambda$ of approximately 1 $\mu$m to 10's of $\mu$m), mid infrared ($\lambda$ of approximately 10's of $\mu$m to 100's of $\mu$m), far infrared ($\lambda$ of approximately 100's of $\mu$m to 1 millimeter (mm)), and microwaves and radio waves including extremely high frequency (EHF) wavelengths ($\lambda$ of approximately 1 mm to 1 centimeter (cm)), super high frequency (SHF) wavelengths ($\lambda$ of approximately 1 cm to 1 decimeter (dm)), ultra-high frequency (UHF) ($\lambda$ of approximately 1 dm to 1 meter (m)), very high frequency (VHF) ($\lambda$ of approximately 1 m to 10's of m), high frequency (HF) ($\lambda$ of approximately 10's of m to 100's of m), medium frequency (MF) ($\lambda$ of approximately 100's of m to 1 of km), low frequency (LF) ($\lambda$ of approximately 1 km to 10's of km), very low frequency (VLF) ($\lambda$ of approximately 10's of km to 100's of km), as well as ultra-low frequency (ULF) wavelengths ($\lambda$ of approximately 100's of km to 1 megameter (Mm)), super low frequency wavelengths (SLF) ($\lambda$ of approximately 1 Mm to 10's of Mm), and extremely low frequency wavelengths (ELF) ($\lambda$ of approximately 10's of Mm to 100's of Mm).

For example, the first imaging device (110) may be able to detect wavelengths of electromagnetic radiation in infrared, and the second imaging device (111) may be able to detect wavelengths of electromagnetic radiation in the visible spectrum. In this example, the IR-detecting first imaging device (110) alone may not be robust enough under certain positions and angles where the SNR may be significantly decreased. The visible-wavelength-detecting second imaging device (111) may be able to increase the SNR by complimenting the first imaging device's (110) captured image through the creation of a heterogeneous signal that includes both IR and visible spectrum data from the first and second imaging devices (110, 111). In this manner, the SNR is increased, and the resolution and detail of the imaged object is greatly increased. Thus, the different patterns of the a multiple-pattern fiducial (100) may be detected by a plurality of different imaging devices. More details regarding the heterogeneous nature of the imaging devices (110, 111) and their role in detecting the different patterns of the a multiple-pattern fiducial (100) are described herein in connection with FIGS. 3 through 5.

Figure 3:
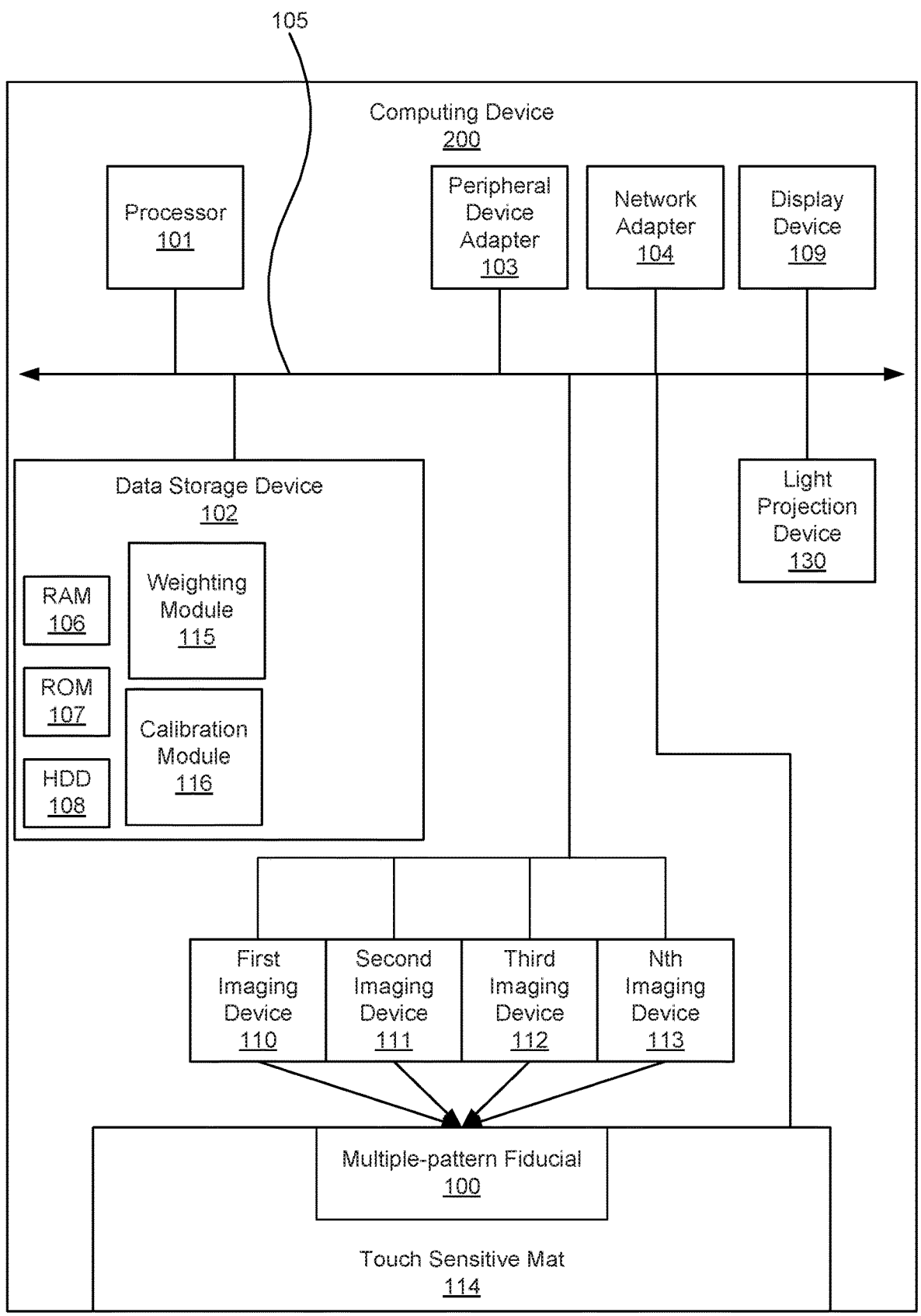
FIG. 3 is a block diagram of a heterogeneous imaging sensor system, according to an example of the principles described herein.
Figure 4:
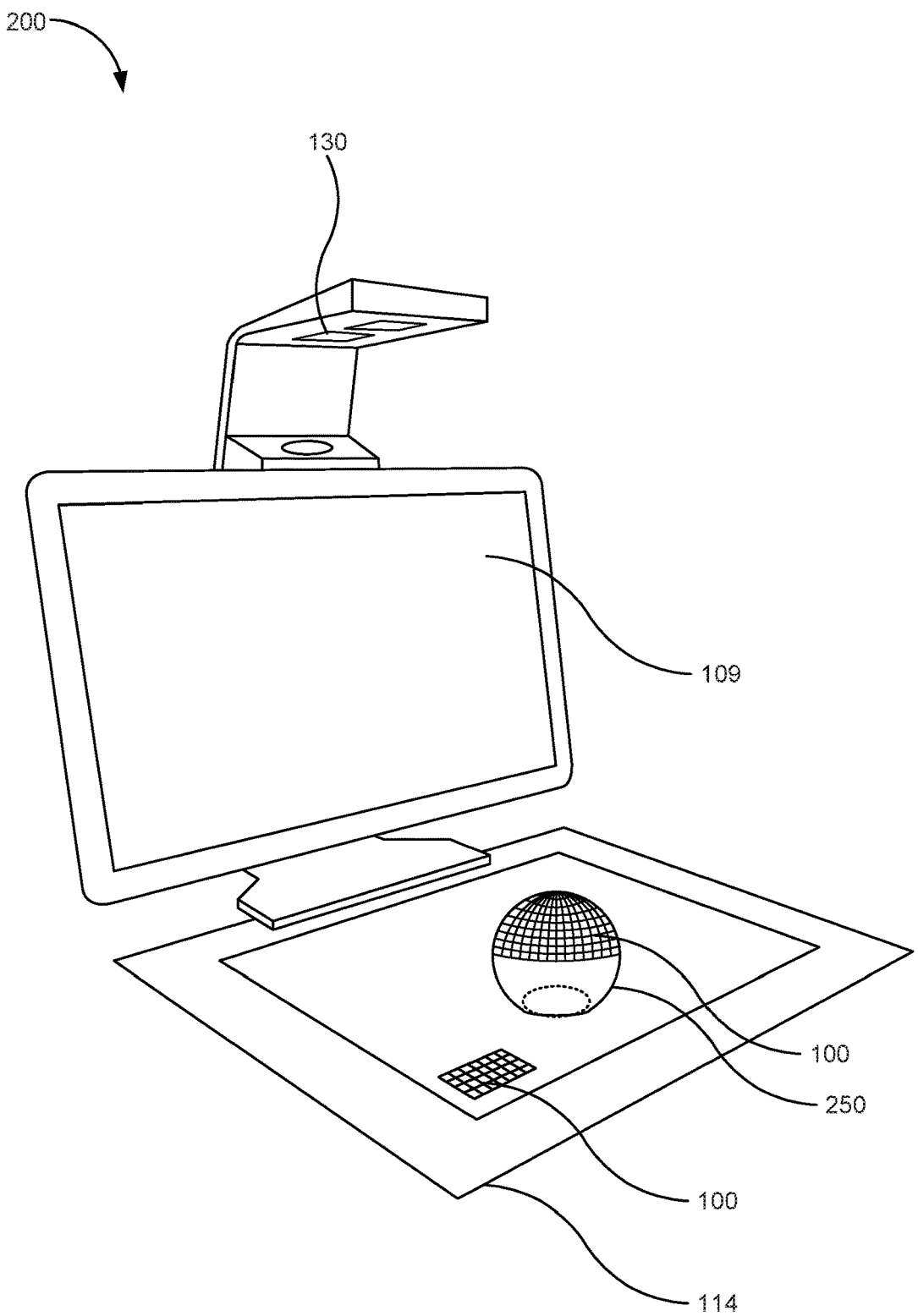
FIG. 4 is a perspective view of a heterogeneous imaging sensor system, according to an example of the principles described herein.
Figure 5:
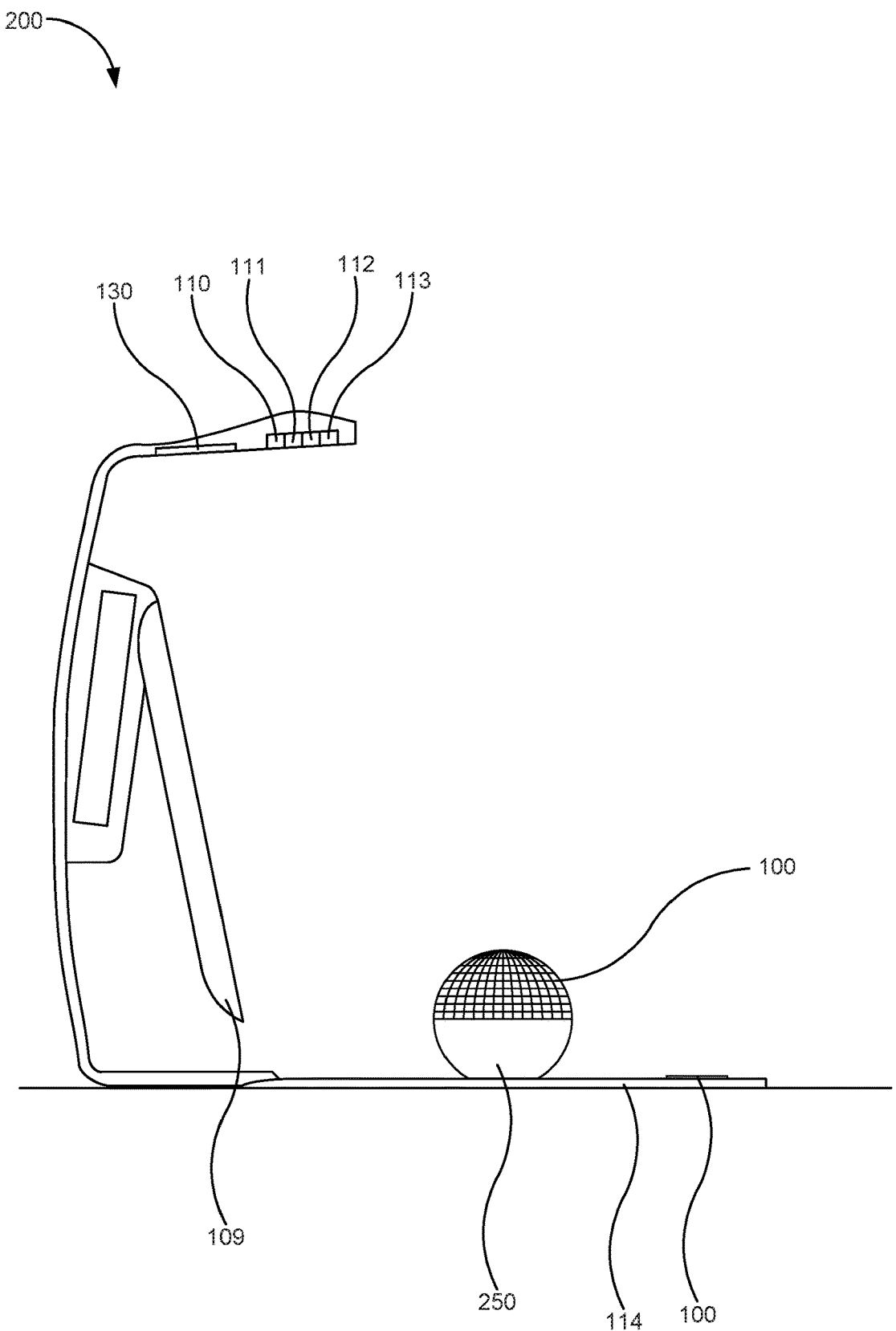
FIG. 5 is a side view of a heterogeneous imaging sensor system, according to an example of the principles described herein.

FIG. 3 is a block diagram of a heterogeneous imaging sensor system (200), according to an example of the principles described herein. FIG. 4 is a perspective view of the heterogeneous imaging sensor system (200), according to an example of the principles described herein. FIG. 5 is a side view of the heterogeneous imaging sensor system (200), according to an example of the principles described herein. The heterogeneous imaging sensor system (200) of FIGS. 3 through 5 is a multi-imaging device scanning system used to derive a 3D model of an object placed in a field of view of the imaging devices including a first (110), a second (111), a third (112), and an Nth (113) imaging device. The Nth imaging device (113) indicates that any number of imaging devices able to detect any corresponding different wavelength of light may be included within the heterogeneous imaging sensor system (200). The positions of the imaging devices (110, 111, 112, 113) within space are calibrated so that the derivation of the 3D image by the imaging devices (110, 111, 112, 113) imaging the objects placed within their view angles will be as accurate and precise as possible. At least one multiple-pattern fiducial (100) is either placed onto or integrated into a touch sensitive mat (114) at which the 3D object (250) is scanned, and the imaging devices (110, 111, 112, 113) use the at least one multiple-pattern fiducial (100) to identify where the imaging devices (110, 111, 112, 113) are located in space with respect to the at least one multiple-pattern fiducial (100) and any target objects (250).

The heterogeneous imaging sensor system (200) may be implemented in an electronic device. Examples of electronic devices include servers, desktop computers, laptop computers, personal digital assistants (PDAs), mobile devices, smartphones, gaming systems, and tablets, among other electronic devices. Further, the heterogeneous imaging sensor system (200) may be utilized in any data processing scenario including, stand-alone hardware, mobile applications, through a computing network, or combinations thereof. Still further, the heterogeneous imaging sensor system (200) may be used in a computing network, a public cloud network, a private cloud network, a hybrid cloud network, other forms of networks, or combinations thereof. In one example, the methods provided by the heterogeneous imaging sensor system (200) are provided as a service over a network by, for example, a third party. In this example, the service may include, for example, the following: a Software as a Service (SaaS) hosting a number of applications; a Platform as a Service (PaaS) hosting a computing platform including, for example, operating systems, hardware, and storage, among others; an Infrastructure as a Service (IaaS) hosting equipment such as, for example, servers, storage components, network, and components, among others; application program interface (API) as a service (APIaaS), other forms of network services, or combinations thereof.

The present systems may be implemented on one or multiple hardware platforms, in which the modules in the system can be executed on one or across multiple platforms. Such modules can run on various forms of cloud technologies and hybrid cloud technologies or offered as a SaaS (Software as a service) that can be implemented on or off the cloud. In another example, the methods provided by the heterogeneous imaging sensor system (200) are executed by a local administrator.

To achieve its desired functionality, the heterogeneous imaging sensor system (200) includes various hardware components. Among these hardware components may be a processor (101), a data storage device (102), a peripheral device adapter (103), a network adapter (104), a display device (109), a touch sensitive mat (114), a light projection device (130), a first imaging device (110), a second imaging device (111), a third imaging device (112), and an Nth imaging device (113). These hardware components may be interconnected through the use of a number of busses and/or network connections such as via bus (105) through which they are communicatively coupled.

The processor (101) may include the hardware architecture to retrieve executable code from the data storage device (102) and execute the executable code. The executable code may, when executed by the processor (101), cause the processor (101) to implement at least the functionality of, projecting light of varying wavelengths onto objects placed on the touch sensitive mat (114), imaging the objects using the imaging devices (110, 111, 112, 113), placing weights on the data defining the images captured by the imaging devices (110, 111, 112, 113), calibrating the imaging devices (110, 111, 112, 113), and perform other functions according to the methods of the present specification described herein. In the course of executing code, the processor (101) may receive input from and provide output to a number of the remaining hardware units.

The data storage device (102) may store data such as executable program code that is executed by the processor (101) or other processing device. As will be discussed, the data storage device (102) may specifically store computer code representing a number of applications that the processor (101) executes to implement at least the functionality described herein. The data storage device (102) may include various types of memory modules, including volatile and nonvolatile memory. For example, the data storage device (102) of the present example includes Random Access Memory (RAM) (106), Read Only Memory (ROM) (107), and Hard Disk Drive (HDD) memory (108). Many other types of memory may also be utilized, and the present specification contemplates the use of many varying type(s) of memory in the data storage device (102) as may suit a particular application of the principles described herein. In certain examples, different types of memory in the data storage device (102) may be used for different data storage needs. For example, in certain examples the processor (101) may boot from Read Only Memory (ROM) (107), maintain nonvolatile storage in the Hard Disk Drive (HDD) memory (108), and execute program code stored in Random Access Memory (RAM) (106).

The data storage device (102) may include a computer readable medium, a computer readable storage medium, or a non-transitory computer readable medium, among others. For example, the data storage device (102) may be, but not limited to, an electronic, magnetic, optical, electromagnetic, infrared, or semiconductor system, apparatus, or device, or any suitable combination of the foregoing. More specific examples of the computer readable storage medium may include, for example, the following: an electrical connection having a number of wires, a portable computer diskette, a hard disk, a random-access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain, or store computer usable program code for use by or in connection with an instruction execution system, apparatus, or device. In another example, a computer readable storage medium may be any non-transitory medium that can contain or store a program for use by or in connection with an instruction execution system, apparatus, or device.

The peripheral adapter (103) and the network adapter (104) in the heterogeneous imaging sensor system (200) enable the processor (101) to interface with various other hardware elements, external and internal to the heterogeneous imaging sensor system (200). For example, the peripheral device adapters (103) may provide an interface to input/output devices, such as, for example, display device (109), a mouse, or a keyboard. The peripheral device adapters (103) may also provide access to other external devices such as an external storage device, a number of network devices such as, for example, servers, switches, and routers, client devices, other types of computing devices, and combinations thereof. The peripheral device adapter (103) may also create an interface between the processor (101) and the display device (109), a printer, or other media output devices. The network adapter (104) may provide an interface to other computing devices within, for example, a network, thereby enabling the transmission of data between the heterogeneous imaging sensor system (200) and other devices located within the network.

The display device (109) may be provided to allow a user of the heterogeneous imaging sensor system (200) to interact with and implement the functionality of the heterogeneous imaging sensor system (200). For example, the display device (109) may display a 3D model or other representation of an object that is imaged by the computing device (200), allow the user to interface with the heterogeneous imaging sensor system (200) during an imaging process or a calibration process, execute programming associated with the manipulation of captured images, and provide instructions to the heterogeneous imaging sensor system (200) to perform the methods described herein. Examples of display devices (109) include a computer screen, a touch screen, a laptop screen, a mobile device screen, a personal digital assistant (PDA) screen, and a tablet screen, among other types of display devices (109).

The heterogeneous imaging sensor system (200) may, when executed by the processor (101), display a number of graphical user interfaces (GUIs) on the display device (109) associated with the executable program code representing the number of applications stored on the data storage device (102).

The touch sensitive mat (114) may be any device through which a user may interact with objects placed on the touch sensitive mat (114), input instructions to the heterogeneous imaging sensor system (200), interact with images projected onto the touch sensitive mat (114) by the light projection device (130), calibrate, through the a multiple-pattern fiducial (100) placed thereon, the imaging devices (110, 111, 112, 113), and perform other functions as described herein. In this manner, the touch-sensitive nature of the mat (114)

allows for a variety of types of user interactions with the heterogeneous imaging sensor system (200).

The light projection device (130) may be used to project images of a captured object onto the surface of the touch sensitive mat (114) for a user to interact with and manipulate. Further, the light projection device (130) may be capable of projecting a variety of wavelengths of light onto the touch sensitive mat (114) and the multiple-pattern fiducial (100) in order to calibrate the positions of the imaging devices (110, 111, 112, 113) within space. The various wavelengths of electromagnetic radiation produced by the light projection device (130) may be aligned with the wavelengths of electromagnetic radiation the imaging devices (110, 111, 112, 113) may capture.

The heterogeneous imaging sensor system (200) further includes a number of modules used in the implementation of the functionality of the heterogeneous imaging sensor system (200) described herein. The various modules within the heterogeneous imaging sensor system (200) include executable program code that may be executed separately. In this example, the various modules may be stored as separate computer program products. In another example, the various modules within the heterogeneous imaging sensor system (200) may be combined within a number of computer program products; each computer program product including a number of the modules.

The heterogeneous imaging sensor system (200) may include a weighting module (115) to, when executed by the processor (101), apply weighted estimation processes to the data collected by the imaging devices (110, 111, 112, 113). In some examples, the ambient lighting surrounding the heterogeneous imaging sensor system (200) or other environmental aspects effecting the ability of the imaging devices (110, 111, 112, 113) to effectively capture images may change. Thus, the heterogeneous natured of the heterogeneous imaging sensor system (200) provides for the ability to fuse different data sets obtained from the imaging devices (110, 111, 112, 113) to capture images of objects placed on the mat (114) and/or calibrate the imaging devices (110, 111, 112, 113) through the multiple-pattern fiducial (100). Thus, weighting processes may be used to increase contrast in the multiple-pattern fiducial (100) by increasing the SNR to detect corners or edges of the boxes (101) in the example of FIG. 1. In a visible spectrum of electromagnetic radiation, it may be difficult for the first imaging device (110) being a visible spectrum imaging device to full capture a high contrast between the boxes (101). Thus, in this example, the second (111), third (112) or Nth (113) imaging devices may also capture an image of the multiple-pattern fiducial (100) including information in the IR spectrum, UV spectrum, or another spectrum of electromagnetic radiation, and the data obtained in these other spectrums may be weighted to provide a higher contrast component of the overall data obtained from the imaging devices (110, 111, 112, 113).

Weighting of different captured images from the different imaging devices (110, 111, 112, 113) may be based on the resolution of the different captured images, the contrast of the different captured images, other characteristic of the different captured images, and combinations thereof to allow a higher weight to be placed one of the different captured images if that one captured image has a desired characteristic. Thus, weighting may be based on signal strength, positions of the imaging devices (110, 111, 112, 113) relative to the mat (114) an object or one another, the angles of imaging devices (110, 111, 112, 113), a size of detected features, a quantity of detected features, or combinations thereof.

In one example, the weighting module (115) automatically weights the different sets of data obtained from the imaging devices (110, 111, 112, 113) to obtain a desirable image. In another example, the weighting module may present on the display device (109) to a user a graphical user interface (GUI) that a user may interact with to allow the user to adjust the weighting of the different sets of data obtained from the imaging devices (110, 111, 112, 113).

The weighting module (115) may use statistical signal analysis, probability-based prediction for multi-mode tracking, fusion of data obtained from the imaging devices (110, 111, 112, 113), or combinations thereof to weight the different signals obtained from the imaging devices (110, 111, 112, 113). In this manner, the weighting module (115) may assist in producing an image of a scanned object that is as precise and accurate as possible.

The heterogeneous imaging sensor system (200) may also include a calibration module (116) to, when executed by the processor (101), calibrate intrinsic parameters of each of the different imaging devices (110, 111, 112, 113) and calibration of the localization of the imaging devices (110, 111, 112, 113) (i.e., extrinsic calibration). The calibration module (116) may perform geometry-based calibration for imaging device-to-imaging device three-dimensional (3D) mapping, and to perform wavelength signal calibration for the wavelengths of electromagnetic radiation the imaging devices (110, 111, 112, 113) are to capture.

Calibration of the intrinsic parameters of the imaging devices (110, 111, 112, 113) include, for example, the optical response of the imaging devices (110, 111, 112, 113), parameters such as focal length and imaging angles, and calibration of color in the case of an imaging device (110, 111, 112, 113) that captures images in visible wavelengths of electromagnetic radiation. In one example, the imaged object may include a color that is difficult for an imaging device (110, 111, 112, 113) that captures visible electromagnetic radiation to appropriately capture. In this example, UV and/or IR capable imaging devices (110, 111, 112, 113) may also capture an image of the object and provide additional data to an overall dataset that increases the resolution, contrast, or other characteristics of the object.

Calibration of the localization of the imaging devices (110, 111, 112, 113) may include identifying, through imaging the multiple-pattern fiducial (100), the location in space of each of the imaging devices (110, 111, 112, 113), identifying imaging angles of the imaging devices (110, 111, 112, 113) relative to, for example, the multiple-pattern fiducial (100) on the touch sensitive mat (114), and identifying each of the imaging devices (110, 111, 112, 113) relative to one another. Calibration of the extrinsic parameters of the imaging devices (110, 111, 112, 113) such as their localization ensures that the dimensions and orientations of scanned objects are precise and accurate. Further, Calibration of the extrinsic parameters of the imaging devices (110, 111, 112, 113) such as their localization ensures that alignment of fused images of a 3D scanned object is correct as to its position in space relative to the imaging devices (110, 111, 112, 113).

Turning to FIGS. 4 and 5, the heterogeneous imaging sensor system (200) may include the multiple-pattern fiducial (100) located on the touch sensitive mat (114). Even though one multiple-pattern fiducial (100) is depicted on the mat (114), any number of fiducials (100) may be included on the mat (114) to allow for a more precise localization of the imaging devices (110, 111, 112, 113) within the heterogeneous imaging sensor system (200). In an example where a plurality of multiple-pattern fiducials (100) are placed on the mat (114), the plurality of multiple-pattern fiducials (100) may each have different patterns that convey different information, or the plurality of multiple-pattern fiducials (100) may each have identical patterns that convey the same information. A plurality of multiple-pattern fiducials (100) imageable by the imaging devices (110, 111, 112, 113) may be located at different locations within a field of view of the first and second imaging devices, and may each include different patterns, reflect different wavelengths of electromagnetic radiation, or combinations thereof.

The multiple-pattern fiducial (100) of the heterogeneous imaging sensor system (200) may convey different information within its patterns of boxes (101) that reflect in different spectral ranges of electromagnetic radiation, may have different sensitivities to different spectral ranges, or may convey the same information within its patterns of boxes (101) that reflect in different spectral ranges of electromagnetic radiation as described herein. Further, both planar and non-planar (three dimensional) fiducials may be included within the heterogeneous imaging sensor system (200). An object (250) may be presented in the field of view of the imaging devices (110, 111, 112, 113) for imaging or for calibration purposes. In one example, the object (250) may also include a 3D version of the fiducial (100) included thereon. In this example, the 3D fiducial (100) may be used to identify the shape of the object (250) or may be used to assist the heterogeneous imaging sensor system (200) in imaging the object (250) to create a 3D model of the object (250).

The different spectral ranges of electromagnetic radiation reflected by the multiple-pattern fiducial (100) may be detected by the imaging devices (110, 111, 112, 113), and the images captured by the imaging devices (110, 111, 112, 113) may be combined to create an image that provides a higher SNR than may be obtained through the use of a single one of the imaging devices (110, 111, 112, 113). Further, in examples where the multiple-pattern fiducial (100) conveys different information within its patterns of boxes (101) that reflect in different spectral ranges of electromagnetic radiation, a multiple amount of information may be conveyed within the same spatial footprint but in different wavelengths of electromagnetic radiation. This allows for a higher amount of data to be provided to the heterogeneous imaging sensor system (200) without additional fiducials being included within the heterogeneous imaging sensor system (200).

Figure 6:
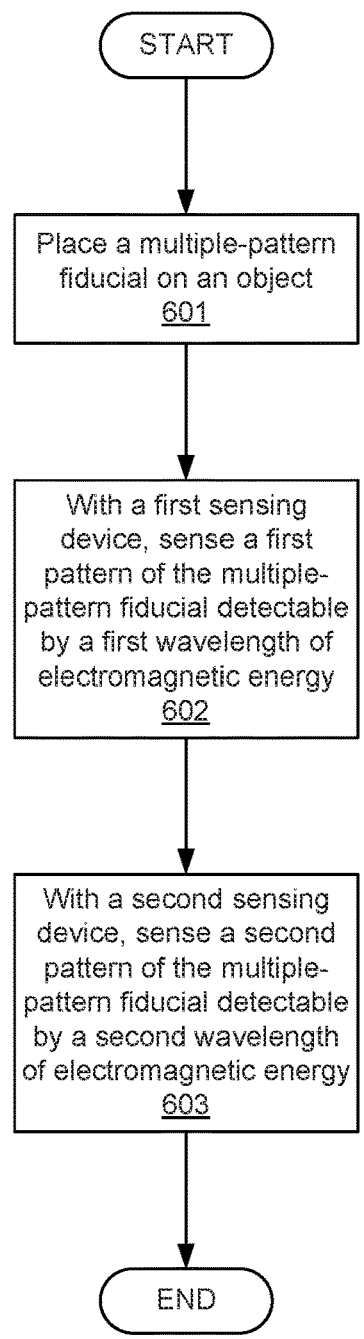
FIG. 6 is a flowchart showing a method of detecting objects, according to an example of the principles described herein.

FIG. 6 is a flowchart showing a method (600) of method of detecting objects, according to an example of the principles described herein. The method (600) may include placing (block 601) a multiple-pattern fiducial (100) on an object. The object in this context may be the mat (114) in the case of a 2D multiple-pattern fiducial (100), or the object may be the 3D object (250) that may include the multiple-pattern fiducial (100) on its surface.

The method (600) may also include sensing (block 602), with a first imaging device (110, 111, 112, 113), a first pattern of the multiple-pattern fiducial (100) detectable by a first wavelength of electromagnetic energy, and, with a second imaging device (110, 111, 112, 113), sensing (block 603) a second pattern of the multiple-pattern fiducial (100) detectable by a second wavelength of electromagnetic energy. In this manner, at least two separate images of the fiducial may be captured at least two different wavelengths of electromagnetic radiation from the multiple-pattern fiducial (100).

Figure 7:
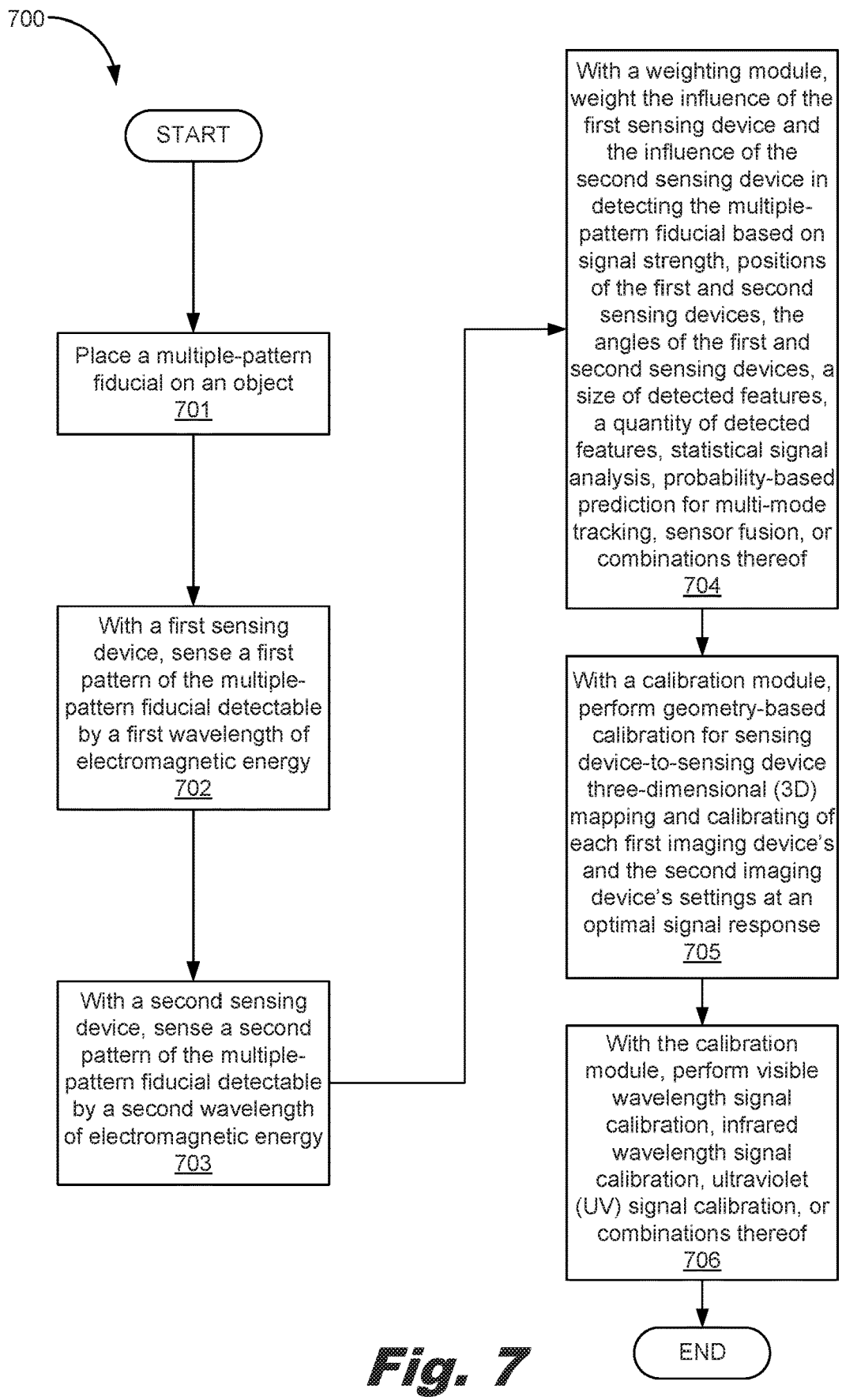
FIG. 7 is a flowchart showing a method of detecting objects, according to an example of the principles described herein.

FIG. 7 is a flowchart showing a method (700) of method of detecting objects, according to an example of the principles described herein. The method (700) may include placing (block 701) a multiple-pattern fiducial (100) on an object. The object in this context may be the mat (114) in the case of a 2D multiple-pattern fiducial (100), or the object may be the 3D object (250) that may include the multiple-pattern fiducial (100) on its surface.

The method (700) may also include sensing (block 702), with a first imaging device (110, 111, 112, 113), a first pattern of the multiple-pattern fiducial (100) detectable by a first wavelength of electromagnetic energy, and, with a second imaging device (110, 111, 112, 113), sensing (block 703) a second pattern of the multiple-pattern fiducial (100) detectable by a second wavelength of electromagnetic energy. In this manner, at least two separate images of the fiducial may be captured at least two different wavelengths of electromagnetic radiation from the multiple-pattern fiducial (100).

The method (700) may also include, with the weighting module (115) executable by the processing device (101), weighting (block 704) the influence of the first imaging device (110, 111, 112, 113) and the influence of the second imaging device (110, 111, 112, 113) in detecting the multiple-pattern fiducial (100) based on signal strength, positions of the first and second imaging devices (110, 111, 112, 113), the angles of the first and second imaging devices (110, 111, 112, 113), a size of detected features, a quantity of detected features, statistical signal analysis, probability-based prediction for multi-mode tracking, sensor fusion, or combinations thereof.

Further, the method (700) of FIG. 7 may include, with the calibration module (116) executable by the processing device (101), performing (block 705) geometry-based calibration for sensing device-to-sensing device three-dimensional (3D) mapping and performing (block 706) visible wavelength signal calibration, infrared wavelength signal calibration, ultraviolet (UV) signal calibration, or combinations thereof, and calibrating of each imaging devices' settings at an optimal signal response. Calibrating of each imaging devices' (110, 111, 112, 113) settings at an optimal signal response includes setting exposure times for each of the imaging devices (110, 111, 112, 113).

Figure 8:
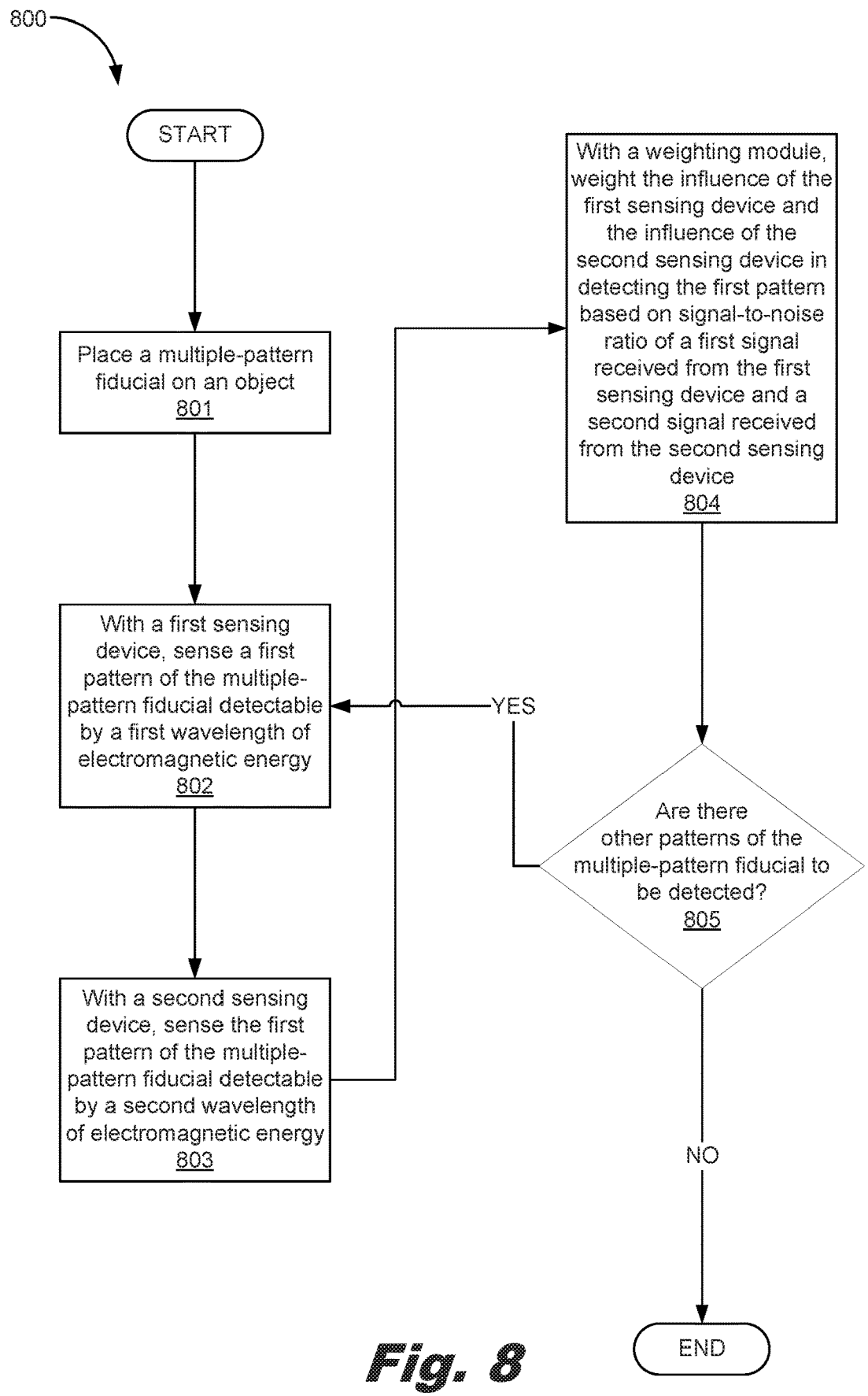
FIG. 8 is a flowchart showing a method of detecting objects, according to an example of the principles described herein.

FIG. 8 is a flowchart showing a method (800) of detecting objects, according to an example of the principles described herein. The method (800) may cover instances where two or more imaging devices (110, 111, 112, 113) are instructed to detect the same pattern within the multiple-pattern fiducial (100) in order to increase the signal-to-noise ratio (SNR) of the detection of that same pattern. The method (800) may include placing (block 801) a multiple-pattern fiducial (100) on an object. The object in this context may be the mat (114) in the case of a 2D multiple-pattern fiducial (100), or the object may be the 3D object (250) that may include the multiple-pattern fiducial (100) on its surface.

A first imaging device (110) may be instructed to sense (block 802) a first pattern of the multiple-pattern fiducial (100) at a first wavelength of electromagnetic energy. The first pattern may be the pattern formed within the multiple-pattern fiducial (100) that are made up of the first feature (101-1). Further, in this example, the first imaging device (110) may sense the first pattern at wavelengths of electromagnetic energy that make up the visible spectrum.

A second imaging device (111) may be instructed to sense (block 803) the first pattern of the multiple-pattern fiducial (100) at a second wavelength of electromagnetic energy. In this manner, the second imaging device (111) is detecting the same pattern within the multiple-pattern fiducial (100) as is detected by the first imaging device (110). In this example, the second imaging device (111) may sense the first pattern at wavelengths of electromagnetic energy that make up the infrared (IR) spectrum.

In order to increase the SNR as detected by the multiple imaging devices (110, 111), the weighting module (115), when executed by the processing device (101), may apply (block 804) a higher weight to a first signal received from the first imaging device (110) and a second signal received from the second signal device (111) based on the SNR of the first signal and the second signal. In other words, the signal that has the higher SNR may receive the higher weighting by the weighting module (115). For example, if the second signal detected by the second imaging device (111) has a higher SNR than the first signal detected by the first imaging device (110), then the weighting module (115) may weigh the second signal higher. This improves the SNR of the entire multiple-pattern fiducial (100) as imaged by the imaging devices (110, 111). Although in the method of FIG. 8 the first imaging device (110) and the second imaging device (111) are used, any number of imaging devices (110, 111, 112, 113) may be included in the method (800), and their respective signals may be compared by the weighting module (115) and assigned weights based on their respective SNRs.

The method (800) may also include determining (block 805) whether there are other patterns of the multiple-pattern fiducial (100) that may be detected. If other patterns such as the patterns in the multiple-pattern fiducial (100) formed by the individual features (101-1, 101-2, 101-3) or combinations of the features (101-1, 101-2, 101-3) are to be detected (block 805, determination YES), then the method (800) may loop back to block 802 where a subsequent pattern may be detected and processed according to blocks 802 through 804. If no other patterns are to be detected (block 805, determination NO), then the method (800) may terminate. In one example, the method (800) of FIG. 8 may be combined with other methods described herein.

Aspects of the present system and method are described herein with reference to flowchart illustrations and/or block diagrams of methods, apparatus (systems) and computer program products according to examples of the principles described herein. Each block of the flowchart illustrations and block diagrams, and combinations of blocks in the flowchart illustrations and block diagrams, may be implemented by computer usable program code. The computer usable program code may be provided to a processor of a general-purpose computer, special purpose computer, or other programmable data processing apparatus to produce a machine, such that the computer usable program code, when executed via, for example, the processor (101) of the computing device (200) or other programmable data processing apparatus, implement the functions or acts specified in the flowchart and/or block diagram block or blocks. In one example, the computer usable program code may be embodied within a computer readable storage medium; the computer readable storage medium being part of the computer program product. In one example, the computer readable storage medium is a non-transitory computer readable medium.

The specification and figures describe a multiple-pattern fiducial for a heterogeneous imaging sensor system. The multiple-pattern fiducial includes a first pattern detectable by a first wavelength of electromagnetic energy, and a second pattern detectable by a second wavelength of electromagnetic energy. The specification and figures describe also a heterogeneous imaging sensor system includes a multiple-pattern fiducial including a plurality of patterns detectable by a corresponding number of wavelengths of electromagnetic energy, a first imaging device to sense a first of the plurality of patterns, the first imaging device detecting a first of the number of wavelengths of electromagnetic energy, and a second imaging device to sense a second of the plurality of patterns, the second imaging device detecting a second of the number of wavelengths of electromagnetic energy.

The systems and methods described herein provide a multiple-pattern target that is robust under environment or lighting changes and may achieve continuous and consistent tracking of an object or a body part with strong signals simultaneously or alternately, given that each sensor can identify its own unique pattern of that domain of the target. The systems and methods described herein also provide for the 3D scanning of objects with multiple sensor fusion that creates a superior 3D model image of the object.

The preceding description has been presented to illustrate and describe examples of the principles described. This description is not intended to be exhaustive or to limit these principles to any precise form disclosed. Many modifications and variations are possible in light of the above teaching.

What is claimed is:

1. A heterogeneous imaging sensor system, comprising:
   a multiple-pattern fiducial comprising a plurality of patterns detectable by a corresponding number of wavelengths of electromagnetic energy, the plurality of patterns comprising defined patterns of encoded information;
   a first imaging device to sense a first of the plurality of patterns, the first imaging device detecting a first of the number of wavelengths of electromagnetic energy; and
   a second imaging device to sense a second of the plurality of patterns, the second imaging device detecting a second of the number of wavelengths of electromagnetic energy.

2. The heterogeneous imaging sensor system of claim 1, wherein the multiple-pattern fiducial for the heterogeneous imaging sensor system comprises:
   a first pattern detectable by a first wavelength of electromagnetic energy; and
   at least a second pattern detectable by a second wavelength of electromagnetic energy.

3. The heterogeneous imaging sensor system of claim 2, wherein the first and at least second pattern convey different information.

4. The heterogeneous imaging sensor system of claim 2, wherein the multiple-pattern fiducial is a two-dimensional (2D) based fiducial.

5. The heterogeneous imaging sensor system of claim 2, wherein the multiple-pattern fiducial is a three-dimensional (3D) based fiducial.

6. The heterogeneous imaging sensor system of claim 1, comprising a weighting module executable by a processing device of the heterogeneous imaging sensor system to weight the influence of the first imaging device and the influence of the second imaging device in detecting the multiple-pattern fiducial.

7. The heterogeneous imaging sensor system of claim 6, wherein the weighting is based on signal strength, positions of the first and second imaging devices, the angles of the first and second imaging devices, a size of detected features, a quantity of detected features, or combinations thereof.

8. The heterogeneous imaging sensor system of claim 6, wherein the weighting module uses statistical signal analysis, probability-based prediction for multi-mode tracking, sensor fusion, or combinations thereof.

9. The heterogeneous imaging sensor system of claim 1, comprising a calibration module executable by a processing device of the heterogeneous imaging sensor system to perform geometry-based calibration for imaging device-to-imaging device three-dimensional (3D) mapping and to perform calibration of each imaging devices' settings at an optimal signal response to perform visible wavelength signal calibration, infrared wavelength signal calibration, ultraviolet (UV) signal calibration, or combinations thereof.

10. The heterogeneous imaging sensor system of claim 1, wherein
   the first imaging device and the second imaging device sense the same pattern of the multiple-pattern fiducial at the first of the number of wavelengths of electromagnetic energy and the second of the number of wavelengths of electromagnetic energy to increase a signal-to-noise ratio (SNR),
   wherein the heterogeneous imaging sensor system weights a first signal received from the first imaging device and a second signal received from the second imaging device with a higher weight based on the SNR of the first signal and the second signal.

11. The heterogeneous imaging sensor system of claim 1, wherein the multiple-pattern fiducial comprises a plurality of multiple-pattern fiducials imageable by the first and second imaging devices, wherein:
   the multiple-pattern fiducials of the plurality are located at different locations within a field of view of the first and second imaging devices,
   each of the plurality of multiple-pattern fiducials comprises different patterns, reflect different wavelengths of electromagnetic radiation, or combinations thereof.

12. A method of detecting objects using the heterogeneous imaging sensor system of claim 5, the method comprising:
   placing the multiple-pattern fiducial on an object;
   with the first imaging device, sensing a first pattern of the multiple-pattern fiducial detectable by a first wavelength of electromagnetic energy; and
   with the second imaging device, sensing a second pattern of the multiple-pattern fiducial detectable by a second wavelength of electromagnetic energy different from the first wavelength.

13. The method of claim 12, comprising, with a weighting module executable by a processing device, weighting the influence of the first imaging device and the influence of the second imaging device in detecting the multiple-pattern fiducial based on signal strength, positions of the first and second imaging devices, the angles of the first and second imaging devices, a size of detected features, a quantity of detected features, statistical signal analysis, probability-based prediction for multi-mode tracking, sensor fusion, or combinations thereof.

14. The method of claim 12, further comprising, with a calibration module executable by a processing device:
   performing geometry-based calibration for imaging device-to-imaging device three-dimensional (3D) mapping; and
   calibrating each of the first imaging device's and the second imaging device's settings at an optimal signal response.

15. The method of claim 12, further comprising, with a calibration module executable by a processing device, performing visible wavelength signal calibration, infrared wavelength signal calibration, ultraviolet (UV) signal calibration, or combinations thereof.

16. The heterogeneous imaging sensor system of claim 1, wherein the first of the number of wavelengths of electromagnetic energy comprise infrared wavelengths, and wherein the second of the number of wavelengths of electromagnetic energy comprise visible wavelengths or ultraviolet wavelengths.

17. The heterogeneous imaging sensor system of claim 1, wherein the multiple-pattern fiducial comprises a checkerboard fiducial with a number of boxes positioned adjacent one another, the boxes forming the plurality of patterns detectable by the corresponding number of wavelengths of electromagnetic energy.

18. The heterogeneous imaging sensor system of claim 1, wherein the plurality of patterns of the multiple-pattern fiducial convey different information for different ranges of electromagnetic radiation within the electromagnetic spectrum.

19. The heterogeneous imaging sensor system of claim 1, wherein the plurality of patterns of the multiple-pattern fiducial convey the same information for different ranges of electromagnetic radiation within the electromagnetic spectrum.

20. The heterogeneous imaging sensor system of claim 1, comprising a touch sensitive mat, wherein the multiple-pattern fiducial is placed on the touch sensitive mat.

* * * * *